No. 644,510. Patented Feb. 27, 1900.
E. F. FROST.
PROCESS OF ELECTRICAL REDUCTION.
(Application filed Nov. 21, 1899.)
(No Model.)
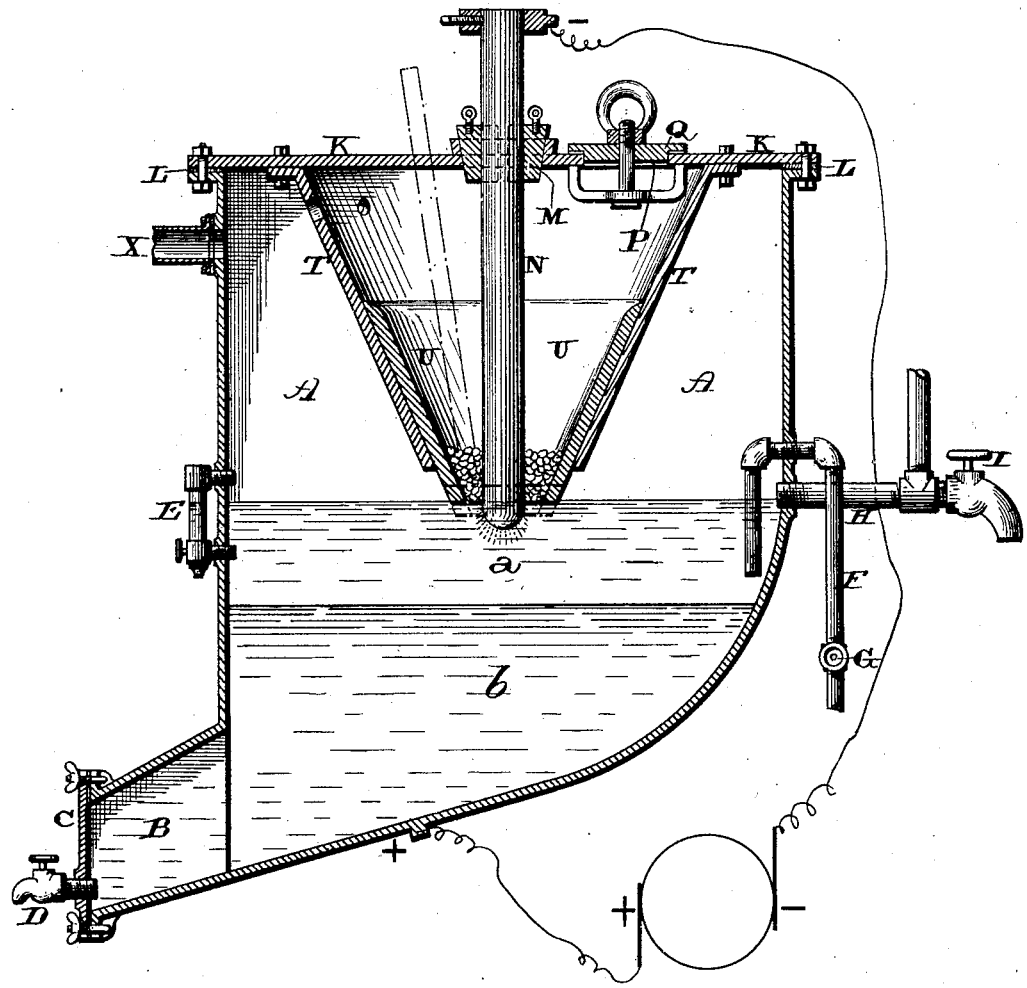
Witnesses,
F. A. Lehmann.
L. S. Black
Inventor,
Ellis F. Frost

UNITED STATES PATENT OFFICE.

ELLIS F. FROST, OF WASHINGTON, DISTRICT OF COLUMBIA, ASSIGNOR OF ONE-HALF TO FREDERICK A. LEHMANN, OF SAME PLACE.

PROCESS OF ELECTRICAL REDUCTION.

SPECIFICATION forming part of Letters Patent No. 644,510, dated February 27, 1900.

Application filed November 21, 1899. Serial No. 737,782. (No specimens.)

*To all whom it may concern:*

Be it known that I, ELLIS F. FROST, a citizen of the United States, residing at Washington, in the District of Columbia, have invented certain new and useful Improvements in the Process of Electrical Reduction of Chemicals and Ores; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to a process of treating materials by means of the electric arc.

My invention consists in treating chemicals and non-conducting ores by the process of mechanically introducing the said materials to be treated into an electric arc formed between an electrode and an electrolyte.

The object of this process is to treat non-conducting ores or bring about chemical reactions in the presence of an electric arc established and maintained between an electrode immersed in an electrolyte and the electrolyte which is in contact with the other electrode.

The accompanying drawing illustrates one form of apparatus for carrying out my process.

A represents a pot or vessel of any suitable shape, size, or construction. As here shown, the bottom of this pot or kettle is inclined, and an opening B is formed at its lowest point for the purpose of drawing off the electrolyte or the residuum which has fallen to the bottom of the vessel, and this opening is closed by a door C of any suitable construction. To this door may also be attached a faucet D or other similar means for drawing off the electrolyte when so desired, and more especially when there is no residuum. This kettle is provided with a gage E, so as to show the level of the electrolyte, and also with a siphon F, which is provided with a cock G, by means of which the electrolyte contained in the vessel can be partially drawn off whenever so desired. Also extending from one side of the vessel A is a combined supply and overflow pipe H, provided with a cock I, through which the electrolyte may be introduced and by means of which the level of the electrolyte is controlled as the reduced material falls into the vessel A and has a constant tendency to change its level.

The top of the vessel A is provided with a cover K, which is insulated from the vessel by a gasket L, and through the center of the cover is an opening M, through which an electrode N, such as a carbon rod, is introduced and lowered sufficiently to dip below the surface of the electrolyte. This electrode may be fed forward mechanically and made self-adjusting by a suitable mechanism provided for this purpose, or it may be fed by hand or any other way that may be preferred. This electrode N is connected to one pole of the electric current. Through the cover is another orifice P, through which the materials to be acted upon are fed. As here shown, this orifice is closed by a suitable cover Q, which may be of any suitable construction preferred and which is used when gas is being generated which it is desirable or necessary to save or to carry off. As the furnace is intended to be continuous in operation, if so desired a feeding-box may be placed above this opening, and the escape of the gas will be prevented in the well-known manner when fresh charges of material are being introduced. This mechanism does not form any special part of this invention and is not here shown, as any well-known feeding mechanism may be employed in this connection. As it is desirable to have the furnace continuous in its operation, it is the intention to apply to the furnace both means to remove the reduced material and means to replenish the charges as rapidly as may be found necessary.

Placed inside of the vessel A, which will be of any suitable height or size desired, is a hopper T, either of the shape here shown or any other that may be preferred, which surrounds the electrode N and into which the orifice P opens. This hopper will either be secured to the cover or upon suitable supports of its own placed inside of the vessel A and is insulated from the positive electrode or vessel A. Placed inside of the lower end of the hopper is a receptacle U, of fire-clay or other refractory material, which is made to fit into and rest on the inner surface of the hopper and to extend below the lower edge of the same. The hopper T and receptacle U are so shaped as to direct the material fed thereinto toward the lower end of the electrode N and into the electrolyte immediately surrounding the same. To accomplish this, the receptacle U is made to have its lower end extend down sufficiently close to the end of the electrode N at, above, or below the surface of the electrolyte, as desired. The lower end of the receptacle U is open when terminating at or above the surface of the electrolyte. When terminating below the surface, it may be opened or closed, as desired.

Whatever material or materials are being treated they are fed forward into the electric arc that is formed between the electrode N and the electrolyte, and any suitable devices may be used when the material is in a powdered or solid form to feed it forward and prevent it from clogging either in the hopper or in the lower end of the receptacle. A device is here shown in dotted lines for this purpose; but its operation is well known and understood and any suitable mechanism that will answer for this purpose may be used.

The electrolyte is of such composition as to admit of decomposition into hydrogen and oxygen.

My process is as follows: The current establishes an arc between the electrode N and the electrolyte. This arc established and maintained, the next procedure is to introduce into this arc such substances as it is desired to have undergo the action of the arc, and therefore as the materials are fed toward the electrolyte they are directed into this arc itself by suitable means. For instance, in treating refractory non-conducting ores the electrical current being sufficient to decompose the electrolyte in the vessel A about the pulverized mass in the end of the receptacle U localizes and concentrates the heat in an arc between the electrode N and the electrolyte sufficient to fuse the refractory powdered ore and free its metallic constituents as the said ore is passed into this arc. As this process is adaptable to chemical treatment as distinguished from ore treatment, some of the various possible ones are illustrated here. If a mixture in proper proportions of lime and carbon is introduced into the receptacle U and fed into the arc established and maintained, as above mentioned, the carbon and the calcium of the lime will be united in the arc to form carbid of calcium. If the electrolyte be water, acidulated or alkalinized, this carbid of calcium after passing through the arc into the water will become decomposed, the carbon of the carbid uniting with the hydrogen of the water to form acetylene gas. This gas as formed will rise above the surface of the electrolyte and be conveyed away through the pipe x. This process therefore forms a simple and continuous one for the direct production of acetylene gas from its elements in the nascent state, the electrolyte being kept cool in any suitable manner. Therefore this process in the manufacture of acetylene gas being continuous is of prime importance in the manufacture of illuminating-gas from coal, and hence it affords a ready and cheap means of producing a gas-enricher.

To save the carbid after it is formed in the arc, the electrolyte used is water acidulated or alkalinized floated on a substance which is lighter than carbid of calcium and necessarily heavier than water, which substance has no chemical affinity for the carbid of calcium and is not a solvent for the water. Such substances are bisulfid of carbon, the heavier paraffin-oils, the heavier oils from coal-tar, and coal-tar itself. I do not restrict myself to these substances, as any substance which possesses the above-named desired properties is within the scope of this invention, and I do not therefore limit this invention to any material which will answer this purpose. The electrolyte and the substance on which it floats being thus arranged, the operation of the manufacture of the carbid of calcium is as follows:

The electricity in passing between the electrolyte and the electrode N establishes an electric arc between them of an exceedingly-high temperature. Into this arc a mixture of lime and carbon is fed by means of the receptacle U, and in the high temperature of this arc the carbon and the calcium of the lime are united to form carbid of calcium. This carbid of calcium at its exceedingly-high temperature now rapidly falls through the electrolyte into the inert material, as coal-tar. The high temperature of the carbid renders it comparatively inert toward the electrolyte. If coal-tar is used, there is this further advantage that the carbid of calcium becomes coated with a protective layer, so that its commercial handling is facilitated, and the violence of the reaction of the carbid to the water when it is desired to produce acetylene gas is thus mitigated.

Having thus described my invention, I claim—

1. The process of treating chemicals or non-conducting ores which consists in forming an electric arc between an electrode and an aqueous electrolyte, and mechanically passing said chemicals or ores into said arc.

2. The process of treating chemicals or non-conducting ores which consists in forming an electric arc between an electrode immersed in an aqueous electrolyte, and the said electrolyte, and mechanically passing the said chemicals or ores into said arc.

3. The process of making carbid of calcium which consists in forming an electric arc between an electrode and an aqueous electrolyte, and passing the mixture of lime and carbon to be acted upon into said arc.

4. The process of making carbid of calcium which consists in forming an electric arc between an electrode and an aqueous electrolyte, passing the mixture of lime and carbon to be acted upon into said arc, and then dropping the carbid through the electrolyte into a substance which protects the material from the action of the electrolyte.

In testimony whereof I affix my signature in presence of two witnesses.

ELLIS F. FROST.

Witnesses:
F. A. LEHMANN,
L. S. BLACK.